(12) United States Patent
Zheng et al.

(10) Patent No.: US 11,164,568 B2
(45) Date of Patent: Nov. 2, 2021

(54) SPEECH RECOGNITION METHOD AND APPARATUS, AND STORAGE MEDIUM

(71) Applicant: TENCENT TECHNOLOGY (SHENZHEN) COMPANY LIMITED, Guangdong (CN)

(72) Inventors: Ping Zheng, Guangdong (CN); Feng Rao, Guangdong (CN); Li Lu, Guangdong (CN); Tao Li, Guangdong (CN)

(73) Assignee: TENCENT TECHNOLOGY (SHENZHEN) COMPANY LTD, Shenzhen (CN)

( * ) Notice: Subject to any disclaimer, the term of this patent is extended or adjusted under 35 U.S.C. 154(b) by 164 days.

(21) Appl. No.: 16/547,097

(22) Filed: Aug. 21, 2019

(65) Prior Publication Data

US 2019/0385599 A1    Dec. 19, 2019

Related U.S. Application Data

(63) Continuation of application No. PCT/CN2018/088646, filed on May 28, 2018.

(30) Foreign Application Priority Data

Jun. 29, 2017 (CN) .......................... 201710517737.4

(51) Int. Cl.
G10L 15/22 (2006.01)
G10L 15/197 (2013.01)
G10L 15/08 (2006.01)

(52) U.S. Cl.
CPC ............ G10L 15/197 (2013.01); G10L 15/22 (2013.01); *G10L 2015/088* (2013.01); *G10L 2015/223* (2013.01)

(58) Field of Classification Search
CPC .................................. G10L 5/22; G10L 15/197
(Continued)

(56) References Cited

U.S. PATENT DOCUMENTS

| 5,040,215 A | 8/1991 | Amano et al. |
| 8,489,398 B1 | 7/2013 | Gruenstein |

(Continued)

FOREIGN PATENT DOCUMENTS

| CN | 101345051 A | 1/2009 |
| CN | 102395013 A | 3/2012 |

(Continued)

OTHER PUBLICATIONS

S. M. Siniscalchi, D. Lyu, T. Svendsen and C. Lee, "Experiments on Cross-Language Attribute Detection and Phone Recognition With Minimal Target-Specific Training Data," in IEEE Transactions on Audio, Speech, and Language Processing, vol. 20, No. 3, pp. 875-887, Mar. 2012, doi: 10.1109/TASL.2011. (Year: 2012).*

(Continued)

*Primary Examiner* — Bharatkumar S Shah
(74) *Attorney, Agent, or Firm* — Sughrue Mion, PLLC

(57) ABSTRACT

A speech recognition method is provided. The method includes: obtaining a voice signal; processing the voice signal according to a speech recognition algorithm to obtain n candidate recognition results, the candidate recognition results including text information corresponding to the voice signal; identifying a target result from among the n candidate recognition results according to a selection rule selected from among m selection rules, the selection rule having an execution sequence of j, the target result being a candidate recognition result that has a highest matching degree with the voice signal in the n candidate recognition results, an initial value of j being 1; and identifying the target result from among the n candidate recognition results according to (Continued)

a selection rule having an execution sequence of j+1 based on the target result not being identified according to the selection rule having the execution sequence of j.

20 Claims, 5 Drawing Sheets

(58) Field of Classification Search
USPC .......................................................... 704/235
See application file for complete search history.

(56) References Cited

U.S. PATENT DOCUMENTS

| | | | |
|---|---|---|---|
| 2006/0074662 A1* | 4/2006 | Block | G10L 15/183 |
| | | | 704/254 |
| 2015/0073788 A1* | 3/2015 | Sak | G10L 15/063 |
| | | | 704/235 |
| 2016/0078866 A1 | 3/2016 | Gelfenbeyn et al. | |
| 2016/0155436 A1* | 6/2016 | Choi | G10L 15/183 |
| | | | 704/232 |
| 2017/0109355 A1 | 4/2017 | Li et al. | |
| 2017/0109676 A1* | 4/2017 | Marcu | G06F 11/3672 |

FOREIGN PATENT DOCUMENTS

| | | |
|---|---|---|
| CN | 103500579 A | 1/2014 |
| CN | 106649514 A | 5/2014 |
| CN | 105654946 A | 6/2016 |
| CN | 106126714 A | 11/2016 |
| CN | 106531160 A | 3/2017 |

OTHER PUBLICATIONS

International Search Report for PCT/CN2018/088646 dated, Aug. 28, 2018 (PCT/ISA/210).
Chinese Office Action for 2017105177374 dated Jun. 29, 2017.
Office Action dated Mar. 17, 2021 in Korean Application No. 10-2019-7028881.
Written Opinion of the International Searching Authority dated Aug. 28, 2018 in International Application No. PCT/CN2018/088646.
Office Action dated Jun. 21, 2021 issued by the Indian Patent Office in Indian Application No. 201947041151.

* cited by examiner

| First correspondence ||
|---|---|
| Key | Value |
| 4 | Pause |
| 6 | Previous |
| 7 | Last |

| Second correspondence |||
|---|---|---|
| Key | Value ||
| 12 | 4 ||
| 13 | 6 | 7 |
| 14 | 6 | 7 |

SPEECH RECOGNITION METHOD AND APPARATUS, AND STORAGE MEDIUM

CROSS REFERENCE TO RELATED APPLICATIONS

This application is a continuation of International Patent Application No. PCT/CN2018/088646, which claims priority to Chinese Patent Application No. 201710517737.4, filed with the China National Intellectual Property Administration on Jun. 29, 2017, the disclosures of which are incorporated herein by reference in their entireties.

BACKGROUND

Field

Methods and apparatuses consistent with embodiments of the present application relate to computers, and in particular, to a speech recognition method and apparatus, and a storage medium.

Related Art

Speech recognition technology is used to generate text information based on voice information. The speech recognition technology is widely applied to scenarios such as voice dialing, voice navigation, smart home control, voice search, and data input.

SUMMARY

One or more embodiments provide a speech recognition method, apparatus, and device, and a storage medium, One or more embodiments may resolve a problem of poor real-time selection of a target result from a plurality of candidate recognition results resulting from a long time taken by a speech recognition device to calculate a perplexity according to an RNN language model.

According to an aspect of an embodiment, there is provided a speech recognition method. The speech recognition method includes: obtaining, by the at least one processor, a voice signal; processing, by the at least one processor, the voice signal according to a speech recognition algorithm to obtain n candidate recognition results, the candidate recognition results including text information corresponding to the voice signal, and n being an integer greater than 1; identifying, by the at least one processor, a target result from among the n candidate recognition results according to a selection rule selected from among m selection rules, the selection rule having an execution sequence of j, the target result being a candidate recognition result that has a highest matching degree with the voice signal in the n candidate recognition results, m being an integer greater than 1, and an initial value of j being 1; and identifying, by the at least one processor, the target result from among the n candidate recognition results according to a selection rule having an execution sequence of j+1 based on the target result not being identified according to the selection rule having the execution sequence of j.

According to an aspect of an embodiment, there is provided a speech recognition apparatus. The speech recognition apparatus includes: at least one memory configured to store computer program code; and at least one processor configured to access the at least one memory and operate as instructed by the computer program code, the computer program code including: signal obtaining code configured to cause the at least one processor to obtain a voice signal; speech recognition code configured to cause the at least one processor to process, using a speech recognition algorithm, the voice signal obtained by the signal obtaining code, to obtain n candidate recognition results, the candidate recognition results including text information corresponding to the voice signal, and n being an integer greater than 1; and identifying code configured to cause the at least one processor to identify, according to a selection rule selected from among m selection rules, the selection rule having an execution sequence of j, a target result from among the n candidate recognition results that are obtained as instructed, the target result being a candidate recognition result that has a highest matching degree with the voice signal in the n candidate recognition results, m being an integer greater than 1, and an initial value of j being 1. The identifying code is further configured to cause the at least one processor to identify the target result from among the n candidate recognition results according to a selection rule having an execution sequence of j+1 based on the identifying code not identifying the target result according to the selection rule having the execution sequence of j.

According to an aspect of an embodiment, there is provided one or more non-transitory storage mediums storing computer readable instructions, the computer readable instructions, when executed by one or more processors, causing the one or more processors to: obtain a voice signal; process the voice signal according to a speech recognition algorithm to obtain n candidate recognition results, the candidate recognition results include text information corresponding to the voice signal, and n being an integer greater than 1; identify a target result from among the n candidate recognition results according to a selection rule selected from among m selection rules, the selection rule having an execution sequence of j, the target result being a candidate recognition result that has a highest matching degree with the voice signal in the n candidate recognition results, m being an integer greater than 1, and an initial value of j being 1; and identify the target result from among the n candidate recognition results according to a selection rule having an execution sequence of j+1 based on the target result not being identified according to the selection rule having the execution sequence of j.

BRIEF DESCRIPTION OF THE DRAWINGS

The above and other aspects, features and advantages will become apparent from the following detailed description taken in conjunction with the accompanying drawings in which.

DETAILED DESCRIPTION

Figure 1:
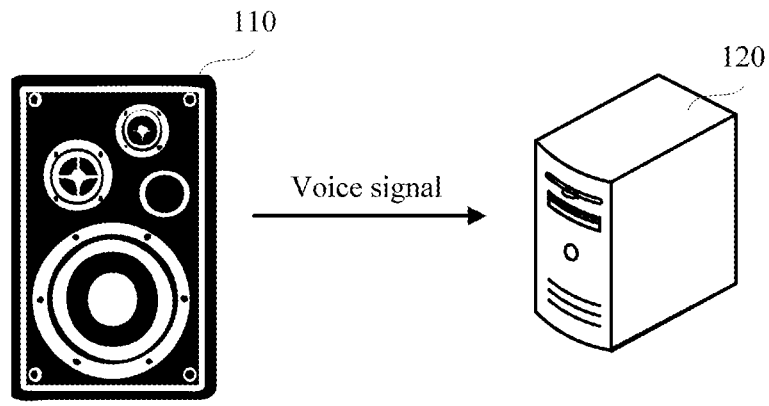
FIG. 1 is a schematic structural diagram of a speech recognition system according to an embodiment.

To better convey the present disclosure, embodiments will be further described in detail with reference to the accompanying drawings. It should be understood that, the specific implementations described herein are only used for interpreting this application, rather than limiting this application. All other embodiments obtained based on the embodiments of the present disclosure shall fall within the protection scope of the present application.

A speech recognition device may be an electronic device having a function of generating text information based on a voice signal. For example, a speech recognition device may recognize spoken words and generate text information corresponding to the recognized words.

The speech recognition device may be a server on which a speech recognition engine is implemented. The speech recognition device may generate the text information based on the voice signal through the speech recognition engine.

The voice signal received by the speech recognition device may be collected by the speech recognition device through an audio collection component (i.e., microphone) or may be collected by a voice receiving device through an audio collection component and sent to the speech recognition device. The voice receiving device may be an electronic device independent of the speech recognition device. For example, the voice receiving device may be a mobile phone, a tablet computer, a smart speaker, a smart television, an intelligent air cleaner, an intelligent air conditioner, an e-book reader, a Moving Picture Experts Group Audio Layer III (MP3) player, a Moving Picture Experts Group Audio Layer IV (MP4) layer, a laptop portable computer, a desktop computer, or the like. However, embodiments are not limited to these specific devices.

The speech recognition device may also be a mobile phone, a tablet computer, a smart speaker, a smart television, an intelligent air cleaner, an intelligent air conditioner, or the like. However, embodiments are not limited to these specific devices.

The speech recognition device may be a server, and the speech recognition device may receive the voice signal from the voice receiving device.

A candidate recognition result for a voice signal may indicate at least one piece of text information recognized by the speech recognition device.

When the speech recognition device obtains at least two candidate recognition results, a target result may be selected from the at least two candidate recognition results. The target result is a candidate recognition result that has a highest matching degree with the voice signal.

Voice signals having the same pronunciation may correspond to a plurality of groups of combinations of different words. For example, nihao corresponds to three combinations "你好 (ni3hao3)", "拟好 (ni3hao3)", and "倪浩 (ni2hao4)". Therefore, the speech recognition device may recognize a plurality of candidate recognition results according to the voice signal. When the speech recognition device recognizes the plurality of candidate recognition results, how to select the candidate recognition result that has the highest matching degree with the voice signal becomes especially important.

Related technology provides a speech recognition method in which, after obtaining n candidate recognition results, a speech recognition device calculates a perplexity of each candidate recognition result according to a recurrent neural network (RNN) and determines that a candidate recognition result corresponding to a smallest value of the perplexities is a target result. The RNN language model is obtained by training according to a general corpus. The perplexities are used for indicating the similarity degrees between the candidate recognition results and the voice signal, and the perplexities and the similarity degrees are in a negative correlation. The target result is a candidate recognition result that has a highest matching degree with an actually received voice signal in the n candidate recognition results, n being an integer greater than 1.

Because it takes a long time to calculate the perplexities according to the RNN language model, real-time of selection the target result from the n candidate recognition results is poor.

FIG. 1 is a schematic structural diagram of a speech recognition system according to an embodiment. The system includes at least one voice receiving device 110 and a speech recognition device 120.

The voice receiving device 110 may be a mobile phone, a tablet computer, a smart speaker, a smart television, an intelligent air cleaner, an intelligent air conditioner, an e-book reader, an MP3 player, an MP4 layer, a laptop portable computer, a desktop computer, or the like. Embodiments are not limited to these specific devices.

An audio collection component 111 is mounted in the voice receiving device 110. The audio collection component 111 is configured to collect a voice signal.

The voice receiving device 110 and the speech recognition device 120 are established and connected through a wireless network or a wired network. After collecting the voice signal through the audio collection component 111, the voice receiving device 110 sends the voice signal to the speech recognition device 120 through the connection.

The speech recognition device 120 is configured to recognize spoken words in the voice signal and generate text information (a candidate recognition result) based on the voice signal. There may be at least two pieces of text information.

The speech recognition device 120 may be configured to select a target result from a plurality of candidate recognition results when recognizing the plurality of candidate recognition results.

The speech recognition device 120 may feed the target result back to the voice receiving device 110 after selecting the target result.

The speech recognition device 120 may be implemented as a server or a server cluster. However, embodiments are not limited thereto.

When physical hardware of a mobile terminal, such as a mobile phone, a tablet computer, a smart speaker, a smart television, an intelligent air cleaner, an intelligent air conditioner, an e-book reader, an MP3 player, an MP4 layer, or a laptop portable computer, supports running a complex algorithm, the speech recognition device 120 may be implemented as at least one of the foregoing mobile terminals. However, embodiments are not limited thereto.

The foregoing wireless network or wired network may use a standard communication technology and/or protocol. A network may usually be the Internet but may alternatively be any network, including but being not limited to, any combination of a local area network (LAN), a metropolitan area network (MAN), a wide area network (WAN), a mobile network, a wired network, a wireless network, a dedicated network, or a virtual dedicated network. In some embodiments, data exchanged by using a network may be represented by using a technology and/or format such as the hyper text mark-up language (HTML) and the extensible markup language (XML). In addition, all or some of links may be encrypted by using a conventional encryption technology such as the Secure Socket Layer (SSL), the Transport Layer Security (TLS), the Virtual Private Network (VPN), and the Internet Protocol Security (IPsec). In some other embodiments, the foregoing data communication technology may be replaced or supplemented with a customized and/or dedicated data communication technology.

Figure 2:
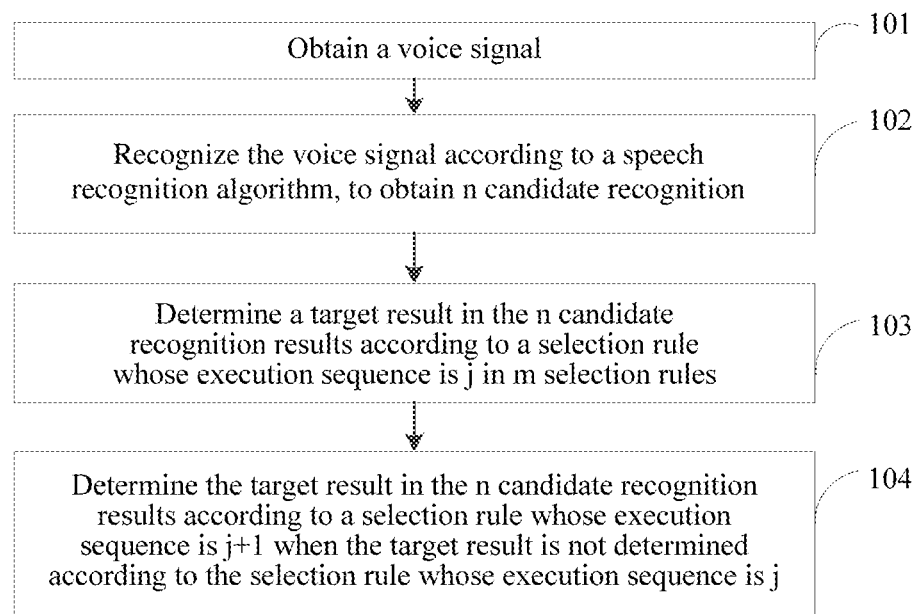
FIG. 2 is a flowchart of a speech recognition method according to an embodiment.

FIG. 2 is a flowchart of a speech recognition method according to an embodiment. This embodiment is described by using an example in which the method is applied to the speech recognition device. The method may include the following several steps:

Step 101: Obtain a voice signal.

The voice signal may be sent by the voice receiving device to the speech recognition device, may be collected by the speech recognition device, or may be input into the speech recognition device through a mobile storage apparatus.

Step 102: Recognize spoken words in the voice signal according to a speech recognition algorithm, to obtain n candidate recognition results.

The candidate recognition result is text information corresponding to the voice signal, and n is an integer greater than 1.

The speech recognition algorithm is used for recognizing the voice signal as at least one piece of text information. The speech recognition algorithm may be a parallel algorithm obtained based on improvement to a Viterbi algorithm, may be a serial algorithm obtained based on improvement to a Viterbi algorithm, or may be a Tree-Trellis algorithm. However, embodiments are not limited thereto.

The speech recognition algorithm may have a function of preliminarily sorting the n candidate recognition results. In this case, the n candidate recognition results obtained by the speech recognition device have sequence identifiers. In this way, when selecting the target result, the speech recognition device sequentially detects, according to a sequence identifier indication sequence, whether the n candidate recognition results are the target result.

It should be noted that the speech recognition device may recognize only one candidate recognition result. However, embodiments are not limited thereto.

Step 103: Determine a target result in the n candidate recognition results according to a selection rule whose execution sequence is j in m selection rules.

The target result is a candidate recognition result that has a highest matching degree with the voice signal in the n candidate recognition results, m being an integer greater than 1, and an initial value of j being 1. $1 \leq j \leq m-1$.

Execution sequences of the m selection rules are determined according to an algorithm complexity degree of each selection rule, and the algorithm complexity degrees and the execution sequences are in a positive correlation. That is, a smaller algorithm complexity degree indicates a smaller sequence number of an execution sequence, and the execution sequence is ranked nearer to the top. A larger algorithm complexity degree indicates a larger sequence number of an execution sequence, and the execution sequence is ranked nearer to the bottom.

The algorithm complexity degrees of the selection rules and speeds of selecting the target result are in a negative correlation. That is, a larger algorithm complexity degree indicates a slower speed of selecting the target result, and a smaller algorithm complexity degree indicates a faster speed of selecting the target result.

The algorithm complexity degree of each selection rule may be represented by a complexity degree identifier. For example, algorithm complexity degree identifiers are 1, 2, and 3, and a smaller value indicates a smaller algorithm complexity degree.

The execution sequences of the m selection rules may be appointed by a developer. Because the algorithm complexity degrees of the m selection rules are all lower than an algorithm complexity degree of calculating the perplexity according to the RNN language model, regardless of which selection rule is preferentially executed, speeds for the speech recognition device to select the target result are all faster than a speed of selecting the target result by calculating the perplexity according to the RNN language model.

In this case, the execution sequence may be represented by an execution sequence identifier. For example, the execution sequence identifier may be #1, #2, or #3. #1 indicates that the execution sequence is 1, #2 indicates that the execution sequence is 2, and #3 indicates that the execution sequence is 3.

The execution sequences of the m selection rules may be randomly selected.

Step 104: Determine the target result in the n candidate recognition results according to a selection rule whose execution sequence is j+1 when the target result is not determined according to the selection rule whose execution sequence is j.

The speech recognition device may not determine the target result according to the selection rule whose execution sequence is j. In this case, the speech recognition device continues determining the target result according to the selection rule whose execution sequence is j+1. The process continues until the target result in the n candidate recognition results is determined.

The speech recognition device may re-sort the n candidate recognition results. A sorting sequence of the target result in the n candidate recognition results is the first. A sorting sequence of a target result in remaining n−1 candidate recognition results excluding the result of the first is the second. A sorting sequence of a target result in remaining n−2 candidate recognition results excluding the results of the first and the second is the third. The process circulates in this way.

In conclusion, in the speech recognition method provided in this application, at least one of m selection rules is executed in sequence to select a target result from n candidate recognition results of speech recognition. An algorithm complexity degree of each selection rule is lower than an algorithm complexity degree of calculating a perplexity according to an RNN language model, to resolve a problem of poor real-time selection of the target result from the plurality of candidate recognition results resulting from a long time taken to calculate the perplexity according to the RNN language model. When the target result can be determined by executing only one selection rule, because an algorithm complexity degree of the selection rule is lower than the algorithm complexity degree of calculating the perplexity according to the RNN language model, real-time selection of the target result from the n candidate recognition results is improved.

The m selection rules may be determined according to different use scenarios. The m selection rules include at least two of a command selection rule, a function selection rule, and a dialogue selection rule. In a command scenario (that is, the voice signal is a message in a command form), the target result can be recognized through the command selection rule in the m selection rules. In a power scenario (that is, the voice signal is a functional message), the target result can be recognized through the function selection rule in the m selection rules. In a dialogue scenario (that is, the voice signal is a message in a dialogue form), the target result can be recognized through the dialogue selection rule in the m selection rules.

The message in a command form is used for instructing the voice receiving device to execute a command. For example, when the voice receiving device is a smart speaker, the message in a command form may be a message such as last, next, pause, or play.

Usually, messages in a command form are irregular and have a limited quantity. For example, a message in a command form of last may change into previous, play last, play previous, switch to previous, switch to last, and the like. The foregoing various changes are irregular, and types of the changes are limited.

Because messages in a command form are irregular and have a limited quantity, in this embodiment, the speech recognition device presets a command lexicon. The command lexicon includes a plurality of command keywords. The command selection rule is used for instructing the speech recognition device to detect, depending on whether the command lexicon includes a command keyword matching an $i^{th}$ candidate recognition result, whether the $i^{th}$ candidate recognition result is the target result, $1 \leq i \leq n$.

The functional message is used for instructing the voice receiving device to execute a command according to at least one voice keyword. For example, the functional message is "play Jay Chou's songs".

Usually, the functional message has a function template in a fixed form and a variable voice keyword. For example, in "play Jay Chou's songs", a function template is play ( )'s songs", and a voice keyword is Jay Chou.

Because usually, the functional message has a function template in a fixed form and a variable voice keyword, in this embodiment, the speech recognition device presets a function template library and a voice lexicon. The function selection rule is used for instructing the speech recognition device to detect, depending on whether the voice lexicon includes a lexicon keyword matching the voice keyword, whether the $i^{th}$ candidate recognition result is the target result, the voice keyword being at least one keyword in the $i^{th}$ candidate recognition result.

The message in a dialogue form is a message that is irregular and whose quantity of changes is unknown. For example, a dialogue message is "what are you doing", "are you free today", "what a movie", and the like.

Because the message in a dialogue form is irregular and has an unknown quantity of changes, in this embodiment, the speech recognition device sets a pre-trained language model. The dialogue selection rule is used for instructing the speech recognition device to determine a similarity degree between each candidate recognition result and the voice signal according to a trained language model, to select the target result.

An algorithm complexity degree of the command selection rule may be lower than an algorithm complexity degree of the function selection rule, and the algorithm complexity degree of the function selection rule may be lower than an algorithm complexity degree of the dialogue selection rule. Correspondingly, the speech recognition device preferentially executes the command selection rule to select the target result, then executes the function selection rule to select the target result when the target result is not selected according to the command selection rule, and then executes the dialogue selection rule to select the target result when the target result is not selected according to the function selection rule.

The algorithm complexity degree of the command selection rule, the algorithm complexity degree of the function selection rule, and the algorithm complexity degree of the dialogue selection rule may all be far smaller than the algorithm complexity degree of selecting the target result according to the RNN language model. Therefore, if the speech recognition device sequentially executes the command selection rule, the function selection rule, and the dialogue selection rule to determine the target result, a total time taken by the speech recognition device is also smaller than a total time taken to select the target result according to the RNN language model.

Selecting the target result according to the command selection rule (referring to the embodiment shown in FIG. 3), selecting the target result according to the function selection rule (referring to the embodiment shown in FIG. 5), and selecting the target result according to the dialogue selection rule (referring to the embodiment shown in FIG. 6) are separately described below.

Figure 3:
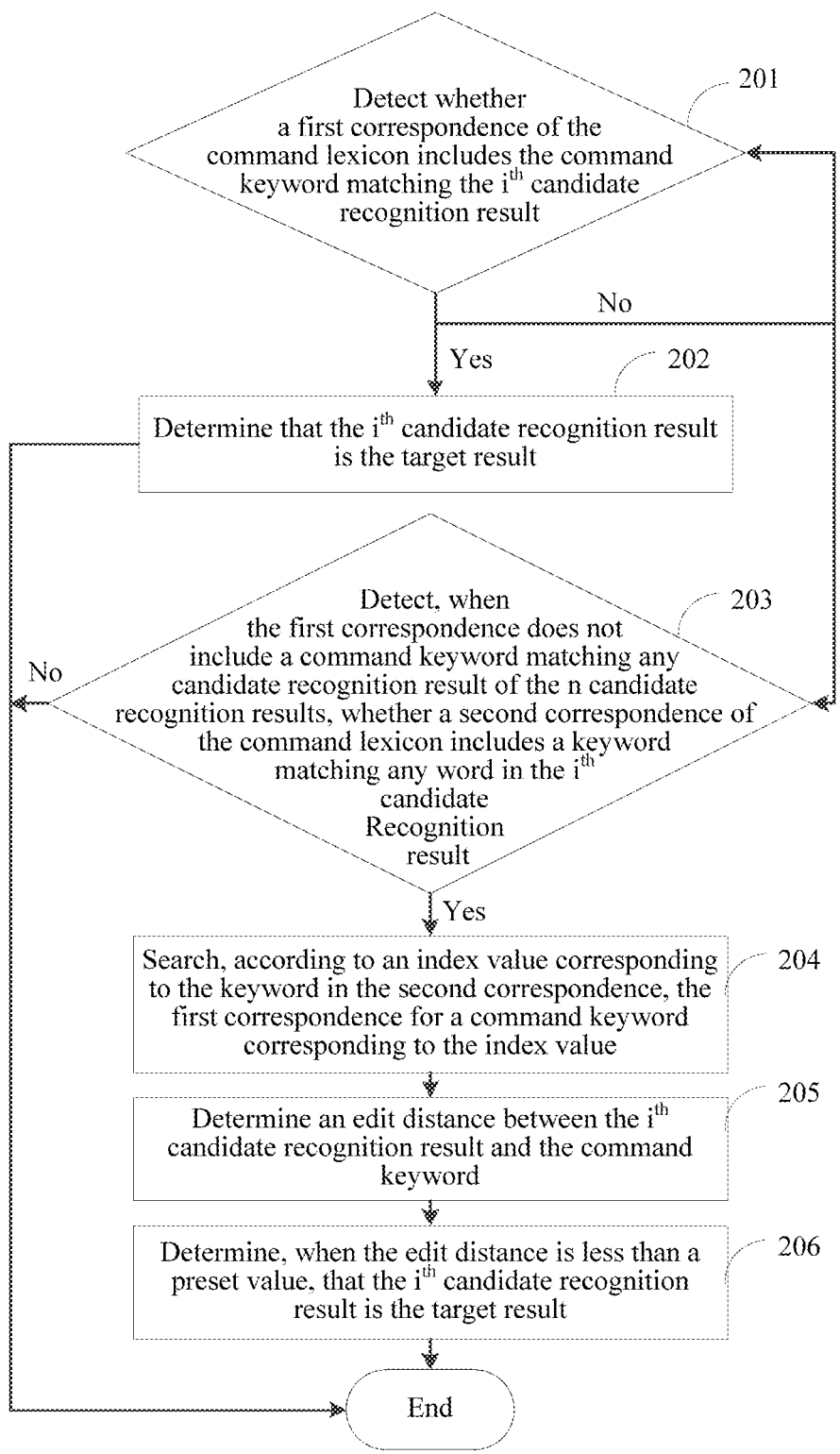
FIG. 3 is a flowchart of a speech recognition method according to another embodiment.

Referring to FIG. 3, FIG. 3 is a flowchart of a speech recognition method according to another embodiment. This embodiment is described by using an example in which the speech recognition method is applied to the speech recognition device. The method may include the following steps:

Step 201: Detect whether a first correspondence of the command lexicon includes the command keyword matching the $i^{th}$ candidate recognition result.

The first correspondence includes a correspondence between index values and command keywords.

The first correspondence may be implemented through a forward table. The forward table includes at least one key value pair, a key in each key value pair is a hash value (index value), and a value in each key value pair is a command keyword.

In this embodiment, a quantity of key value pairs in the first correspondence is not limited. For example, the quantity of key value pairs in the first correspondence is 1000.

That the speech recognition device detects whether the first correspondence of the command lexicon includes the command keyword matching the $i^{th}$ candidate recognition result includes: calculating a hash value of the $i^{th}$ candidate recognition result, detecting whether a key equal to the hash value exists in the first correspondence, determining that the first correspondence includes the command keyword matching the $i^{th}$ candidate recognition result and performing step 202 if yes, and making i=i+1 and continuing performing this step if not.

The first correspondence may refer to including at least one command keyword, matching, by the speech recognition device, the $i^{th}$ candidate recognition result with each command keyword, performing step 202 if the first correspondence includes the command keyword matching the $i^{th}$ candidate recognition result, and making i=i+1 and continuing performing this step if the first correspondence does not include the command keyword matching the $i^{th}$ candidate recognition result.

Step 202: Determine that the $i^{th}$ candidate recognition result is the target result; the process ends.

When the first correspondence includes command keywords corresponding to at least two candidate recognition results, the speech recognition device may use the first candidate recognition result as the target result, or the speech recognition device performs step 203, and selects the target result from the at least two candidate recognition results again.

Step 203: Detect, when the first correspondence does not include a command keyword matching any candidate recognition result of the n candidate recognition results, whether a second correspondence of the command lexicon includes a keyword matching any word in the $i^{th}$ candidate recognition result.

The second correspondence includes a correspondence between index values and keywords, and the command keywords include the keywords.

The second correspondence may be implemented through an inverted table. The inverted table includes at least one key value pair, a key in each key value pair is a hash value of a keyword, and a value in each key value pair is at least one index value corresponding to the keyword in the first correspondence.

That the speech recognition device detects whether the second correspondence in the command lexicon includes a keyword matching any word in the $i^{th}$ candidate recognition result includes: calculating a hash value of each word in the $i^{th}$ candidate recognition result; detecting whether the second correspondence includes a key equal to a hash value of any word; determining that the second correspondence includes a keyword matching a word in the $i^{th}$ candidate recognition result and performing step 204 if the second correspondence includes a key equal to a hash value of any word; and making i=i+1 and continuing performing this step if the second correspondence does not include a key equal to a hash value of any word.

A key of each key value pair in the second correspondence may alternatively be a keyword.

Step 204: Search, according to an index value corresponding to the keyword in the second correspondence, the first correspondence for a command keyword corresponding to the index value.

Because the command keyword includes a keyword, and different command keywords may include the same keyword, a quantity of command keywords that are found by the speech recognition device according to an index value corresponding to a keyword, that is, a value in a key value pair corresponding to a keyword in the second correspondence is at least one.

In this embodiment, the command keyword matching the $i^{th}$ candidate recognition result is detected by combining the first correspondence and the second correspondence, so that the speech recognition device does not need to store all change forms of the command keyword but only needs to store keywords included in all change forms to determine the corresponding command keyword, thereby saving storage space of the speech recognition device.

Step 205: Determine an edit distance between the $i^{th}$ candidate recognition result and the command keyword.

The edit distance (or referred to as a Levenshtein distance) is used for indicating a quantity of operations required for conversion of the $i^{th}$ candidate recognition result into the command keyword. The conversion operations include, but are not limited to: replacement, insertion, and deletion.

The speech recognition device may determine a plurality of command keywords. In this case, the edit distance between the $i^{th}$ candidate recognition result and each command keyword is determined.

For example, the $i^{th}$ candidate recognition result is "在停 (zai4ting2)", and the command keyword determined by the speech recognition device is "暂停 (zan4ting2)". The speech recognition device needs to only replace "在 (zai4)" with "暂 (zan4)" to convert "在停 (zai4ting2)" into "暂停 (zan4ting2)". The edit distance between the $i^{th}$ candidate recognition result and the command keyword is 1.

Step 206: Determine, when the edit distance is less than a preset value, that the $i^{th}$ candidate recognition result is the target result.

When the edit distance is less than the preset value, it indicates that a similarity degree between the $i^{th}$ candidate recognition result and the command keyword is high. In this case, it is determined that the $i^{th}$ candidate recognition result is the target result.

A value of the preset value is usually small, and the value of the preset value is not limited in this embodiment. For example, the preset value is 2.

Figures 4, 5:
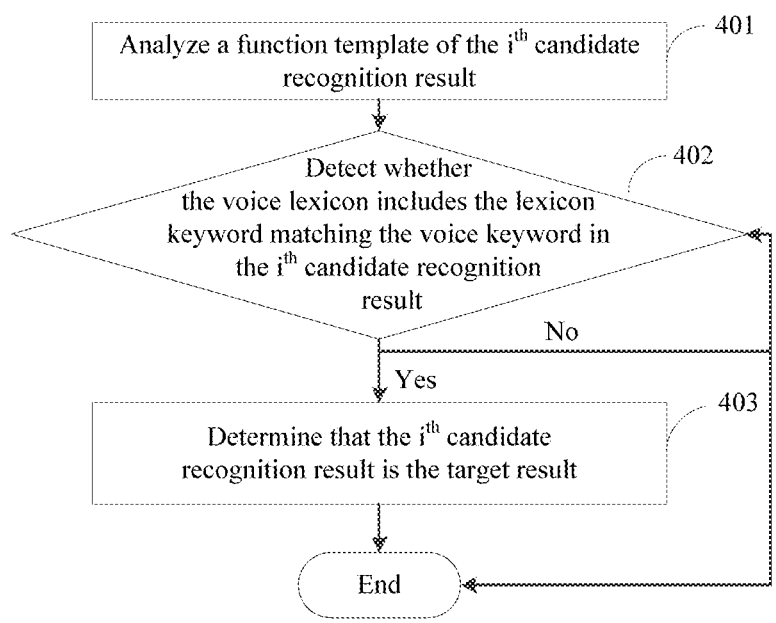
FIG. 4 is a diagram illustrating tables of a first correspondence and a second correspondence according to an embodiment.
FIG. 5 is a flowchart of a speech recognition method according to another embodiment.

Referring to a diagram of a first correspondence and a second correspondence shown in FIG. 4, the first correspondence includes three key value pairs, and each key value pair includes an index value and a command keyword; the second correspondence includes three key value pairs, and each key value pair includes a hash value and an index value.

If the speech recognition device recognizes four candidate recognition results, the four candidate recognition results are respectively: 再填 (zai4tian2), 在田 (zai4tian2), 在填 (zai4tian2), and 暂停 (zan4ting2). The speech recognition device calculates hash values of the four candidate recognition results. The hash value of 再填 (zai4tian2) is 1, the hash value of 在田 (zai4tian2) is 2, the hash value of 在填 (zai4tian2) is 3, and the hash value of 暂停 (zan4ting2) is 4. A key in the first correspondence includes 4. Therefore, it is determined that 暂停 (zan4ting2) is the target result.

If the speech recognition device recognizes four candidate recognition results, the four candidate recognition results are respectively: 再填 (zai4tian2), 在田 (zai4tian2), 在填 (zai4tian2), and 在停 (zai4ting2). The speech recognition device calculates hash values of the four candidate recognition results. The hash value of 再填 (zai4tian2) is 1, the hash value of 在田 (zai4tian2) is 2, the hash value of 在填 (zai4tian2) is 3, and the hash value of 在停 (zai4ting2) is 4. In this case, a key in the first correspondence does not include 1, 2, 3, and 5. Therefore, the speech recognition device calculates a hash value of each word in each candidate recognition result. For the candidate recognition result "在停 (zai4ting2)", the hash value of "在 (zai4)" is 11, the hash value of "停 (ting2)" is 12, and the key in the second correspondence includes 12. The speech recognition device searches the first correspondence for the command keyword "暂停 (zan4ting2)" corresponding to the index value 4 according to the index value 4 corresponding to 12 in the second correspondence. An edit distance between "在停 (zai4ting2)" and "暂停 (zan4ting2)" is 1 and is less than the preset value 2. Therefore, it is determined that "在停 (zai4ting2)" is the target result.

When edit distances between all the candidate recognition results and the command keyword are all greater than or equal to the preset value, the target result may not be selected according to the command selection rule. In this case, the speech recognition device continues selecting the target result according to another selection rule, determines that the first candidate recognition result is the target result, or does not select the target result; the process ends. The another selection rule is the function selection rule or the dialogue selection rule.

The speech recognition device may determine that a candidate recognition result having a smallest edit distance is the target result.

In conclusion, in the speech recognition method provided in this application, the target result in the n candidate recognition results is selected through the command selection rule. When the target result can be determined by executing only the command selection rule, because the algorithm complexity degree of the command selection rule is lower than the algorithm complexity degree of calculating the perplexity according to the RNN language model, real-time selection of the target result from the n candidate recognition results is improved.

In addition, the command keyword matching the $i^{th}$ candidate recognition result is detected by combining the first correspondence and the second correspondence, so that the speech recognition device does not need to store all change forms of the command keyword but only needs to store keywords included in all change forms to determine the corresponding command keyword, thereby saving storage space of the speech recognition device.

The speech recognition device may send the target result to the voice receiving device. The voice receiving device performs a corresponding operation according to a command corresponding to the target result. For example, the voice receiving device is a smart speaker, and the target result is pause. Therefore, after receiving the target result, the smart speaker pauses playing currently played audio information.

Referring to FIG. 5, FIG. 5 is a flowchart of a speech recognition method according to another embodiment. This embodiment is described by using an example in which the speech recognition method is applied to the speech recognition device. The method may include the following steps:

Step 401: Analyze a function template of the $i^{th}$ candidate recognition result, $1 \leq i \leq n$.

The speech recognition device may preset a function template library. The function template library includes at least one function template.

The function template may be represented through, or referred to as, a regular expression. For example, the function template is "a (.+)'s song". A quantity of function templates in the function template library is not limited in this embodiment. For example, the quantity of function templates in the function template library is 540.

The regular expression is used for retrieving and/or replacing text information satisfying a function template.

The speech recognition device analyzes the function template of the $i^{th}$ candidate recognition result by matching the $i^{th}$ candidate recognition result with each function template in the function template library.

Step 402: Detect whether the voice lexicon includes the lexicon keyword matching the voice keyword in the $i^{th}$ candidate recognition result.

The $i^{th}$ candidate recognition result includes the function template and at least one voice keyword. After analyzing the function template of the $i^{th}$ candidate recognition result, the speech recognition device uses remaining keywords in the $i^{th}$ candidate recognition result as the voice keyword.

The speech recognition device presets a voice lexicon, and the voice lexicon includes at least one lexicon keyword. A quantity of lexicon keywords in the voice lexicon is not limited in this embodiment. For example, the quantity of lexicon keywords in the voice lexicon is 1 million.

The speech recognition device matches the voice keyword in the $i^{th}$ candidate recognition result with at least one lexicon keyword in the voice lexicon one by one. When the voice lexicon includes the lexicon keyword matching the voice keyword in the $i^{th}$ candidate recognition result, perform step 403. When the voice lexicon does not include the lexicon keyword matching the voice keyword in the $i^{th}$ candidate recognition result, make i=i+1 and continue performing this step.

Step 403: Determine that the $i^{th}$ candidate recognition result is the target result; the process ends.

When the target result is not selected according to the function selection rule, the speech recognition device may continue selecting the target result according to another selection rule, determine that the first candidate recognition result is the target result, or does not select the target result; the process ends. The another selection rule is the command selection rule or the dialogue selection rule.

That the target result is not selected according to the function selection rule includes, but is not limited to, the following several situations: the speech recognition device does not analyze function templates of the candidate recognition results, or the speech recognition device does not find lexicon keywords matching voice keywords in the candidate recognition results in the voice lexicon.

It is assumed that the speech recognition device obtains three candidate recognition results, respectively: 1. 我想听图案歌的歌 (wo3 xiang3ting1 tu2an4ge1 de ge1), 2. 我想听童安格的咯 (wo3 xiang3ting1 tong2an1ge2 de lo), and 3. 我想听童安格的歌 (wo3 xiang3ting1 tong2an1ge2 de ge1). The speech recognition device respectively matches the three candidate recognition results with the function template in the function template library, to obtain that a function template of the first candidate recognition result is "我想听 (.+)的歌 (wo3 xiang3ting1 (.+) de ge1)", that a function template of the second candidate recognition result is "我想听 (.+)的(.+)(wo3 xiang3ting1 (.+) de (.+))", and that a function template of the third candidate recognition result is 我想听 (.+)的歌 (wo3 xiang3ting1 (.+) de ge1)".

For the first candidate recognition result, the voice keyword is 图案歌(tu2an4ge1). For the second candidate recognition result, the speech recognition device uses the first keyword as the voice keyword, that is, the voice keyword is 童安格(tong2an1ge2). For the third candidate recognition result, the voice keyword is 童安格(tong2an1ge2).

The speech recognition device sequentially matches the voice keywords in the candidate recognition results with the lexicon keyword in the voice lexicon. When matching the voice keyword in the second candidate recognition result with the lexicon keyword, the speech recognition device can determine the lexicon keyword matching the voice keyword and determines that the second candidate recognition result is the target result.

For the second candidate recognition result, the speech recognition device may use all keywords as the voice keyword, that is, the voice keyword is 童安格(tong2an1ge2) and 咯 (lo). In this case, although the voice lexicon includes the lexicon keyword matching 童安格 (tong2an1ge2), the voice lexicon does not include the lexicon keyword matching 咯 (lo). In this case, the speech recognition device sequentially matches the voice keywords in the candidate recognition results with the lexicon keyword in the voice lexicon. When matching the voice keyword in the third candidate recognition result with the lexicon keyword, the speech recognition device can determine the lexicon keyword matching the voice keyword and determines that the third candidate recognition result is the target result.

In conclusion, in the speech recognition method provided in this application, the target result in the n candidate recognition results is selected through the function selection rule. When the target result can be determined by executing only the function selection rule, because the algorithm complexity degree of the function selection rule is lower than the algorithm complexity degree of calculating the perplexity according to the RNN language model, real-time selection of the target result from the n candidate recognition results is improved.

The speech recognition device sends the target result to the voice receiving device. The voice receiving device performs a corresponding operation according to the voice keyword in the target result. For example, the voice receiving device is a smart speaker, and the target result is playing Jay Chou's songs. Therefore, the smart speaker searches for Jay Chou's songs after receiving the target result and plays audio information corresponding to a searching result.

The speech recognition device may perform searching according to the voice keyword in the target result and send a searching result to the voice receiving device. The voice receiving device plays audio information corresponding to the searching result. For example, the voice receiving device is a smart speaker, and the target result is playing Jay Chou's songs. Therefore, the speech recognition device searches for Jay Chou's songs according to a voice keyword, Jay Chou, in the target result and sends a searching result to the smart speaker. The smart speaker plays audio information corresponding to the searching result.

Figure 6:
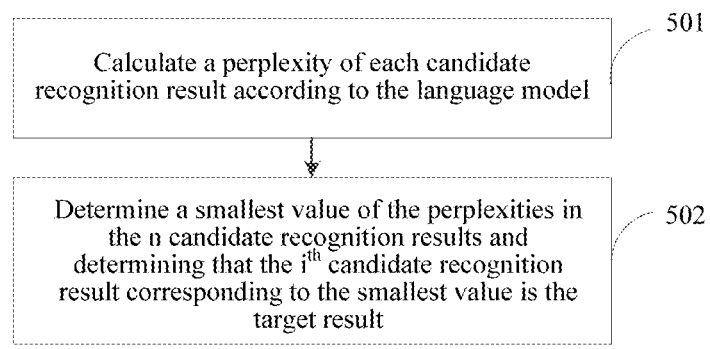
FIG. 6 is a flowchart of a speech recognition method according to another embodiment.

Referring to FIG. 6, FIG. 6 is a flowchart of a speech recognition method according to another embodiment. This embodiment is described by using an example in which the speech recognition method is applied to the speech recognition system. The method may include the following steps:

Step 501: Calculate a perplexity of each candidate recognition result according to the language model.

The perplexity is used for indicating a similarity degree between the candidate recognition result and the voice signal. The perplexity and the similarity degree are in a negative correlation.

The language model is a mathematical model for describing an inherent law of natural languages.

The language model may be an N-gram language model that is generated according to a dedicated corpus corresponding to at least one field. The N-gram language model is used for determining an occurrence probability of a current word according to occurrence probabilities of N−1 words before the current word, N being a positive integer. A value of N is not limited in this embodiment. For example, N is 3, and a 3-gram language model is also referred to as a Tri-gram language model. For example, N is 2, and a 2-gram language model is also referred to as a Bi-gram language model.

The N-gram language model describes the properties and relationship of natural language basic units, such as words, word groups, and sentences, by using probabilities and distribution functions and reflects generation and processing rules based on statistical principles in natural languages.

In this embodiment, descriptions are made by using an example in which the speech recognition device calculates a perplexity of each candidate recognition result according to the 3-gram language model or the 2-gram language model.

The 3-gram language model may be represented through the following formula:

$$p(S)=p(w1)p(w2|w1)p(w3|w1,w2) \ldots p(wn|w1, w2, \ldots ,wn-1)=p(w1)p(w2|w1)p(w3|w1, w2) \ldots p(wn|wn-1,wn-2)$$

$p(S)$ represents a probability of occurrence of a candidate recognition result, $p(w1)$ represents a probability of occurrence of the first word in the candidate recognition result, $p(w2|w1)$ represents a probability of occurrence of the second word in the candidate recognition result due to occurrence of the first word, $p(w3|w1,w2)$ represents a probability of occurrence of the third word in the candidate recognition result due to occurrence of the first word and the second word, and $p(wn|wn-1,wn-2)$ represents a probability of occurrence of the $n^{th}$ word in the candidate recognition result due to occurrence of a previous word (the $(n-1)^{th}$ word) and a previous but one word (the $(n-2)^{th}$ word).

The 2-gram language model may be represented through the following formula:

$$p(S)=p(w1)p(w2|w1)p(w3|w1,w2) \ldots p(wn|w1, w2, \ldots ,wn-1)=p(w1)p(w2|w1)p(w3|w2) \ldots p(wn|wn-1)$$

$p(S)$ represents a probability of occurrence of a candidate recognition result, $p(w1)$ represents a probability of occurrence of the first word in the candidate recognition result, $p(w2|w1)$ represents a probability of occurrence of the second word in the candidate recognition result due to occurrence of the first word, $p(w3|w2)$ represents a probability of occurrence of the third word in the candidate recognition result due to occurrence of the second word, and $p(wn|wn-1)$ represents a probability of occurrence of the $n^{th}$ word in the candidate recognition result due to occurrence of a previous word (the $(n-1)^{th}$ word).

At least one field includes, but is not limited to, the following ones: the weather field, the music field, the mathematics field, the sports field, the computer field, the home field, the geographical field, and the natural field. Although not described, the at least one field may also include other fields.

The speech recognition device calculates the perplexity of each candidate recognition result through a preset formula according to the language model.

The perplexity may be regarded as a geometric mean of an occurrence probability of a candidate word after each word predicted by the language model. Usually, a probability of occurrence of the candidate recognition result and the perplexity are in a negative correlation. That is, a larger probability of occurrence of the candidate recognition result indicates a lower perplexity; a smaller probability of occurrence of the candidate recognition result indicates a higher perplexity.

When the speech recognition device calculates the perplexity of each candidate recognition result through a preset formula according to the language model, the speech recognition device may first calculate a cross entropy of each candidate recognition result and determine a perplexity of a language recognition result according to the cross entropy and the preset formula.

The cross entropy is used for indicating a difference between a model language determined by a language model and the candidate recognition result. A smaller cross entropy indicates a smaller difference between the model language and the candidate recognition result and a higher matching degree between the candidate recognition result and the voice signal. A larger cross entropy indicates a greater difference between the model language and the candidate recognition result and a lower matching degree between the voice signal and the matching degree.

The language model may be of another type, such as a neural network language model. However, embodiments are not limited thereto.

Step 502: Determine a smallest value of the perplexities in the n candidate recognition results and determining that the $i^{th}$ candidate recognition result corresponding to the smallest value is the target result.

Because a smaller perplexity indicates a higher similarity degree between the candidate recognition result and the voice signal, it is determined that the $i^{th}$ candidate recognition result corresponding to the smallest value of the perplexities is the target result.

In conclusion, in the speech recognition method provided in this application, the target result in the n candidate recognition results is selected through the dialogue selection rule. When the target result can be determined by executing only the dialogue selection rule, because the algorithm complexity degree of the dialogue selection rule is lower than the algorithm complexity degree of calculating the perplexity according to the RNN language model, real-time selection of the target result from the n candidate recognition results is improved.

The speech recognition device may send the target result to the voice receiving device. The voice receiving device obtains dialogue information according to the target result. For example, the voice receiving device is a smart speaker, and the target result is "what are you doing". Therefore, after receiving the target result, the smart speaker generates dialogue information according to a dialogue model.

The speech recognition device may generate the dialogue information according to the target result and sends the dialogue information to the voice receiving device. The voice receiving device plays audio information corresponding to the dialogue information. For example, the voice receiving device is a smart speaker, and the target result is "what are you doing". Therefore, the speech recognition device generates the dialogue information according to the target result and sends the dialogue information to the smart speaker, and the smart speaker plays audio information corresponding to the dialogue information.

It should be noted that the embodiment shown in FIG. 3, any two of the embodiment shown in FIG. 5, and the embodiment shown in FIG. 6 may be combined to form a new embodiment, or the three embodiments are combined to form a new embodiment. Using m=3 as an example, the command selection rule is the first selection rule, the function selection rule is the second selection rule, and the dialogue selection rule is the third selection rule.

The following is an apparatus embodiment, which can be used to execute the method embodiments. For details not disclosed in the apparatus embodiment, refer to the method embodiments.

Figure 7:
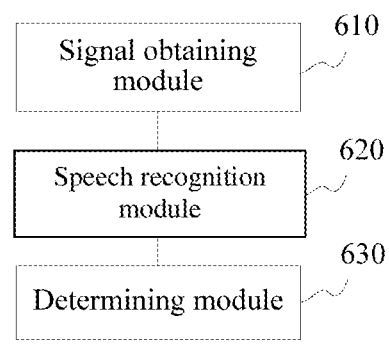
FIG. 7 is a block diagram of a speech recognition apparatus according to an embodiment.

Referring to FIG. 7, FIG. 7 is a block diagram of a speech recognition apparatus according to an embodiment. The apparatus has functions of performing the foregoing method examples. The functions may be implemented by using hardware, or may be implemented by hardware executing corresponding software. The apparatus may include a signal obtaining module 610, a speech recognition module 620, and a determining module 630.

The signal obtaining module 610 is configured to obtain a voice signal.

The speech recognition module 620 is configured to recognize, according to a speech recognition algorithm, the voice signal obtained by the signal obtaining module 610, to obtain n candidate recognition results, the candidate recognition results being text information corresponding to the voice signal, and n being an integer greater than 1.

The determining module 630 is configured to determine, according to a selection rule whose execution sequence is j in m selection rules, a target result in the n candidate recognition results that are obtained by recognition by the speech recognition module 620, the target result being a candidate recognition result that has a highest matching degree with the voice signal in the n candidate recognition results, m being an integer greater than 1, and an initial value of j being 1.

The determining module 630 is configured to determine the target result in the n candidate recognition results according to a selection rule whose execution sequence is j+1 when the target result is not determined according to the selection rule whose execution sequence is j.

Execution sequences of the m selection rules may be determined according to respective algorithm complexity degrees, and the execution sequences and the algorithm complexity degrees are in a positive correlation.

The m selection rules may include at least two of a command selection rule, a function selection rule, and a dialogue selection rule, an algorithm complexity degree of the command selection rule may be lower than an algorithm complexity degree of the function selection rule, and the algorithm complexity degree of the function selection rule may be lower than an algorithm complexity degree of the dialogue selection rule, the command selection rule being used for instructing a speech recognition device to detect, depending on whether a command lexicon includes a command keyword matching an $i^{th}$ candidate recognition result, whether the $i^{th}$ candidate recognition result is the target result, 1≤i≤n;

the function selection rule being used for instructing the speech recognition device to detect, depending on whether a voice lexicon includes a lexicon keyword matching a voice keyword, whether the $i^{th}$ candidate recognition result is the target result, the voice keyword being at least one keyword in the $i^{th}$ candidate recognition result; and the dialogue selection rule being used for instructing the speech recognition device to determine a similarity degree between each candidate recognition result and the voice signal according to a trained language model, to select the target result.

The determining module 630 may include a first detection unit and a first determining unit.

the first detection unit being configured to detect whether a first correspondence of the command lexicon includes the command keyword matching the $i^{th}$ candidate recognition result, 1≤i≤n; and the first determining unit being configured to determine, when the first correspondence includes the command keyword matching the $i^{th}$ candidate recognition result, that the $i^{th}$ candidate recognition result is the target result, the first correspondence including at least the command keyword.

The determining module 630 may further include a second detection unit, a keyword searching unit, a second determining unit, and a third determining unit.

the second detection unit being configured to detect, when the first correspondence does not include a command keyword matching any candidate recognition result of the n candidate recognition results, whether a second correspondence of the command lexicon includes a keyword matching any word in the $i^{th}$ candidate recognition result;

the keyword searching unit being configured to, when the second correspondence includes a keyword matching a word in the $i^{th}$ candidate recognition result, search, according to an index value corresponding to the keyword in the second correspondence, the first correspondence for a command keyword corresponding to the index value;

the second determining unit being configured to determine an edit distance between the $i^{th}$ candidate recognition result and the command keyword, the edit distance being used for indicating a quantity of operations required for conversion of the $i^{th}$ candidate recognition result into the command keyword; and the third determining unit being configured to determine, when the edit distance is less than a preset value, that the $i^{th}$ candidate recognition result is the target result, the first correspondence including a correspondence between the index value and the command keyword, and the second correspondence including a correspondence between the index value and the keyword.

The determining module 630 may include a template analysis unit, a third detection unit, and a fourth determining unit, the template analysis unit being configured to analyze a function template of the $i^{th}$ candidate recognition result, $1 \leq i \leq n$;

the third detection unit being configured to detect whether the voice lexicon includes the lexicon keyword matching the voice keyword in the $i^{th}$ candidate recognition result; and the fourth determining unit being configured to determine, when the voice lexicon includes the lexicon keyword matching the voice keyword in the $i^{th}$ candidate recognition result, that the $i^{th}$ candidate recognition result is the target result, the voice keyword being at least one keyword in the $i^{th}$ candidate recognition result, the $i^{th}$ candidate recognition result including the function template and the voice keyword.

The determining module 630 may include a perplexity calculation unit and a fifth determining unit, the perplexity calculation unit being configured to calculate a perplexity of each candidate recognition result according to the language model;

the fifth determining unit being configured to determine a smallest value of the perplexities in the n candidate recognition results and determining that the $i^{th}$ candidate recognition result corresponding to the smallest value is the target result, the perplexities being used for indicating the similarity degrees between the candidate recognition results and the voice signal, the perplexities and the similarity degrees being in a negative correlation, the language model being an N-gram language model that is generated according to a dedicated corpus corresponding to at least one field, and the N-gram language model being used for determining an occurrence probability of a current word according to occurrence probabilities of N−1 words before the current word, N being a positive integer.

An embodiment further provides a computer-readable storage medium. The computer-readable storage medium may be a computer-readable storage medium included in the memory, or may be a computer-readable storage medium that exists alone and is not assembled into the speech recognition device. The computer-readable storage medium stores at least one instruction, at least one program, and a code set or an instruction set, and the at least one instruction, the at least one program, and the code set or the instruction set is loaded and executed by the processor to implement the speech recognition method according to the foregoing method embodiments.

Figure 8:
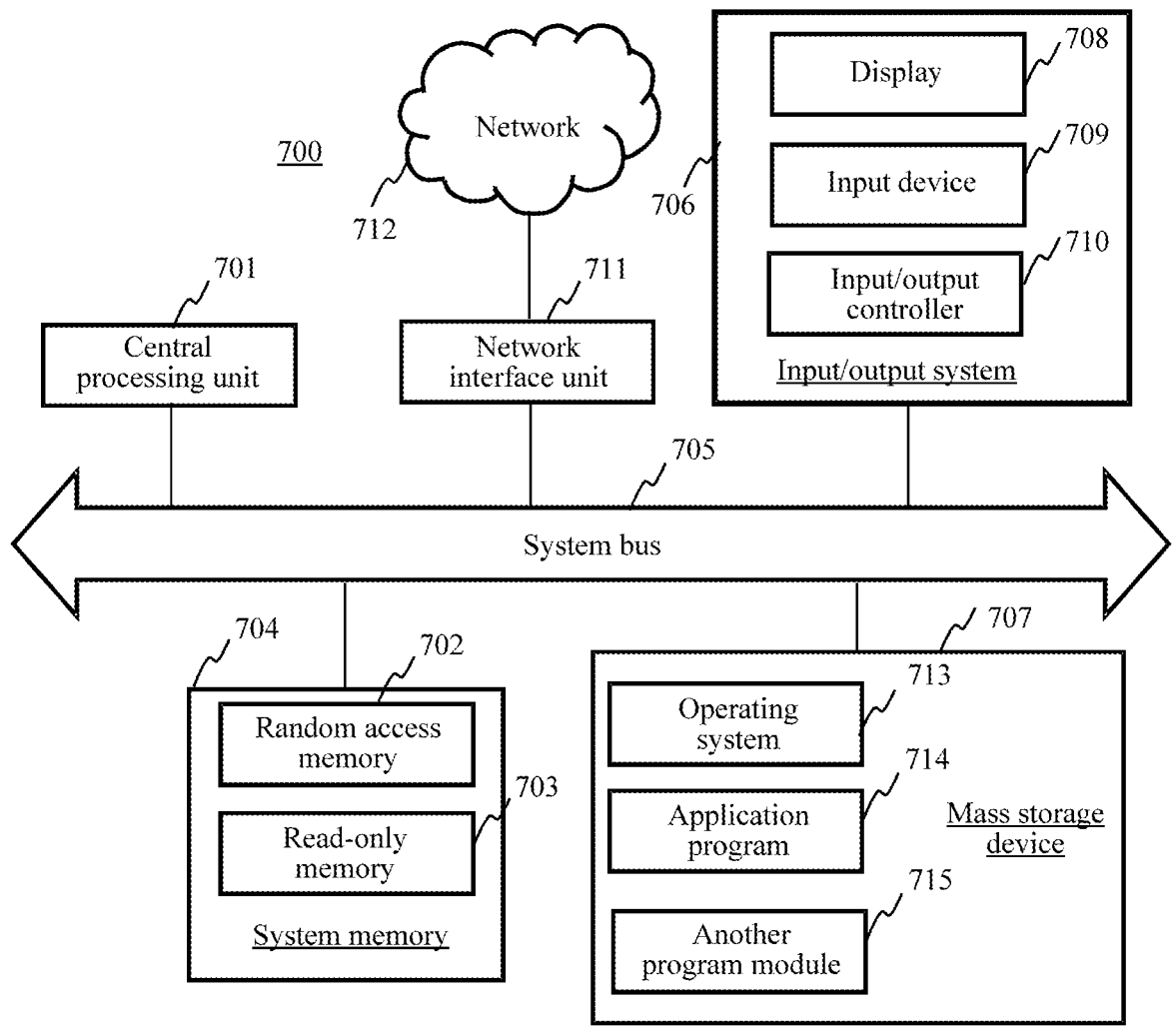
FIG. 8 is a schematic diagram of a speech recognition device according to an embodiment.

FIG. 8 is a schematic structural diagram of a speech recognition device according to an embodiment. The speech recognition device 700 includes a Central Processing Unit (CPU) 701, a system memory 704 including a random access memory (RAM) 702 and a read-only memory (ROM) 703, and a system bus 705 connecting the system memory 704 and the CPU 701. The speech recognition device 700 further includes a basic input/output system (I/O system) 706 for transmitting information between components in a computer, and a mass storage device 707 used for storing an operating system 713, an application program 714, and another program module 715.

The basic I/O system 706 includes a display 708 configured to display information, and an input device 709 used by a user to input information, such as a mouse or a keyboard. The display 708 and the input device 709 are both connected to the CPU 701 by using an input/output controller 710 connected to the system bus 705. The basic I/O system 706 may further include the input/output controller 710, to receive and process inputs from multiple other devices, such as the keyboard, the mouse, or an electronic stylus. Similarly, the input/output controller 710 further provides an output to a display screen, a printer or another type of output device.

The mass storage device 707 is connected to the CPU 701 by using a mass storage controller connected to the system bus 705. The mass storage device 707 and an associated computer-readable medium provide non-volatile storage for the speech recognition device 700. That is, the mass storage device 707 may include a computer-readable medium such as a hard disk or a compact disc ROM (CD-ROM) drive.

The computer-readable medium may include a computer storage medium and a communication medium. The computer storage medium includes volatile and non-volatile media, and removable and non-removable media implemented by using any method or technology and configured to store information such as a computer-readable instruction, a data structure, a program module, or other data. The computer storage medium includes a RAM, a ROM, an erasable programmable ROM (EPROM), an electrically erasable programmable ROM (EEPROM), a flash memory or another solid-state memory technology, a CD-ROM, a digital versatile disc (DVD) or another optical memory, a tape cartridge, a magnetic cassette, a magnetic disk memory, or another magnetic storage device. Certainly, a person skilled in the art would appreciate that the computer storage medium is not limited to the foregoing types. The system memory 704 and the mass storage device 707 may be collectively referred to as a memory.

According to the embodiments, the speech recognition device 700 may further be connected, through a network such as the Internet, to a remote computer on the network. That is, the speech recognition device 700 may be connected to a network 712 by using a network interface unit 711 connected to the system bus 705, or may be connected to another type of network or a remote computer system by using a network interface unit 711.

Specifically, in this embodiment, the speech recognition device 700 further includes a memory and one or more programs, where the one or more programs are stored in the memory, and are configured to be executed by one or more processors. The one or more programs include an instruction used for performing the foregoing speech recognition method.

According to an embodiment, there is provided a speech recognition system. The speech recognition system includes a smart speaker and a server. The smart speaker may be the voice collection device as shown in FIG. 1, and the server may be the speech recognition device shown in FIG. 1.

The smart speaker being configured to collect a voice signal and send the voice signal to the server.

The server is configured to: obtain a voice signal; recognize spoken words in the voice signal according to a speech recognition algorithm, obtain n candidate recognition results, the candidate recognition results being text information corresponding to the voice signal, and n being an integer greater than 1; determine a target result in the n candidate recognition results according to a selection rule whose execution sequence is j in m selection rules, the target result being a candidate recognition result that has a highest matching degree with the voice signal in the n candidate recognition results, m being an integer greater than 1, and an initial value of j being 1; and determine the target result in the n candidate recognition results according to a selection rule whose execution sequence is j+1 when the target result is not determined according to the selection rule whose execution sequence is j, and send the target result to the smart speaker. The server may recognize the target result according to the speech recognition method shown in any one of FIG. 3 to FIG. 6.

The smart speaker is further configured to make a response according to the target result. The response includes but is not limited to: at least one of performing a command execution according to the target result, making a function response according to the target result, and making a voice dialogue according to the target result.

For example, performing a command execution according to the target result includes at least one of the following command executions: play, pause, last, and next.

For example, making a function response according to the target result includes at least one of the following function responses: playing a song of a singer, a song name, or a style, playing a music program of a host, a program name, or a type, voice navigation, schedule reminder, and translation.

For example, making a voice dialogue according to the target result includes at least one of the following dialogue scenarios: weather questions and answers, knowledge questions and answers, entertainment chatting, and joke explanation.

A person of ordinary skill in the art would understand that all or some of the steps of the foregoing embodiments may be implemented by using hardware, or may be implemented by a program instructing relevant hardware. The program may be stored in a computer-readable storage medium. The storage medium may be a ROM, a magnetic disk, an optical disc, or the like.

The foregoing descriptions are intended to convey aspects of embodiments, and are not intended to limit this application. Any modification, equivalent replacement, or improvement made within the spirit and principle shall fall within the protection scope of this application.

What is claimed is:

1. A speech recognition method, performed by at least one processor, comprising:
    obtaining, by the at least one processor, a voice signal;
    processing, by the at least one processor, the voice signal according to a speech recognition algorithm to obtain n candidate recognition results, the candidate recognition results comprising text information corresponding to the voice signal, and n being an integer greater than 1;
    identifying, by the at least one processor, a target result from among the n candidate recognition results according to a selection rule selected from among m selection rules, the selection rule having an execution sequence of j, the target result being a candidate recognition result that has a highest matching degree with the voice signal in the n candidate recognition results, m being an integer greater than 1, an initial value of j being 1, and the m selection rules comprising at least two selected from among a command selection rule, a function selection rule, and a dialogue selection rule; and
    identifying, by the at least one processor, the target result from among the n candidate recognition results according to a selection rule having an execution sequence of j+1 based on the target result not being identified according to the selection rule having the execution sequence of j.

2. The speech recognition method according to claim 1, further comprising identifying, by the at least one processor, execution sequences of the m selection rules according to respective algorithm complexity degrees,
    wherein the execution sequences and the algorithm complexity degrees have a positive correlation.

3. The speech recognition method according to claim 1, wherein an algorithm complexity degree of the command selection rule is lower than an algorithm complexity degree of the function selection rule, and the algorithm complexity degree of the function selection rule is lower than an algorithm complexity degree of the dialogue selection rule,
    wherein the command selection rule is used for instructing a speech recognition device to detect, depending on whether a command lexicon comprises a command keyword matching an $i^{th}$ candidate recognition result, whether the $i^{th}$ candidate recognition result is the target result, i being an integer, and $1 \le i \le n$,
    wherein the function selection rule is used for instructing the speech recognition device to detect, depending on whether a voice lexicon comprises a lexicon keyword matching a voice keyword, whether the $i^{th}$ candidate recognition result is the target result, the voice keyword being at least one keyword in the $i^{th}$ candidate recognition result, and
    wherein the dialogue selection rule is used for instructing the speech recognition device to identify a similarity degree between each candidate recognition result and the voice signal according to a trained language model, to select the target result.

4. The speech recognition method according to claim 3, wherein the selection rule having the execution sequence of j comprises the command selection rule, and the identifying the target result comprises:
    detecting whether a first correspondence of the command lexicon comprises the command keyword matching the $i^{th}$ candidate recognition result; and
    identifying, based on the first correspondence comprising the command keyword matching the $i^{th}$ candidate recognition result, the $i^{th}$ candidate recognition result as the target result,
    wherein the first correspondence comprises at least the command keyword.

5. The speech recognition method according to claim 4, wherein after the detecting whether the first correspondence of the command lexicon comprises the command keyword matching the $i^{th}$ candidate recognition result, the method further comprises:

detecting, by the at least one processor and based on the first correspondence not comprising a command keyword matching any of the n candidate recognition results, whether a second correspondence of the command lexicon comprises a keyword matching any word in the $i^{th}$ candidate recognition result;

searching, by the at least one processor and based on the second correspondence comprising a keyword matching a word in the $i^{th}$ candidate recognition result, according to an index value corresponding to the keyword in the second correspondence, the first correspondence for a command keyword corresponding to the index value;

identifying, by the at least one processor, an edit distance between the $i^{th}$ candidate recognition result and the command keyword, the edit distance indicating a quantity of operations required for conversion of the $i^{th}$ candidate recognition result into the command keyword; and identifying, by the at least one processor and based on the edit distance being less than a preset value, the $i^{th}$ candidate recognition result as the target result, wherein the first correspondence comprises a correspondence between the index value and the command keyword, and the second correspondence comprises a correspondence between the index value and the keyword.

6. The speech recognition method according to claim 3, wherein the selection rule having the execution sequence of j comprises the function selection rule, and the identifying the target result in the n candidate recognition results according to the selection rule having the execution sequence of j comprises:

analyzing, by the at least one processor, a function template of the $i^{th}$ candidate recognition result;

detecting, by the at least one processor, whether the voice lexicon comprises the lexicon keyword matching the voice keyword in the $i^{th}$ candidate recognition result; and identifying, by the at least one processor and based on the voice lexicon comprising the lexicon keyword matching the voice keyword in the $i^{th}$ candidate recognition result, the $i^{th}$ candidate recognition result as the target result, wherein the $i^{th}$ candidate recognition result comprises the function template and the voice keyword.

7. The speech recognition method according to claim 3, wherein the selection rule having the execution sequence of j comprises the dialogue selection rule, and the identifying the target result in the n candidate recognition results according to the selection rule having the execution sequence of j comprises:

calculating, by the at least one processor, a perplexity of each candidate recognition result according to the language model;

identifying, by the at least one processor, a smallest value of the perplexities in the n candidate recognition results and identifying the $i^{th}$ candidate recognition result corresponding to the smallest value as the target result, wherein the perplexities are used for indicating the similarity degrees between the candidate recognition results and the voice signal, the perplexities and the similarity degrees have a negative correlation, the language model is an N-gram language model that is generated according to a dedicated corpus corresponding to at least one field, the N-gram language model is used for identifying an occurrence probability of a current word according to occurrence probabilities of N−1 words before the current word, and N is a positive integer.

8. A speech recognition apparatus, comprising:

at least one memory configured to store computer program code; and at least one processor configured to access the at least one memory and operate as instructed by the computer program code, the computer program code including:

signal obtaining code configured to cause the at least one processor to obtain a voice signal;

speech recognition code configured to cause the at least one processor to process, using a speech recognition algorithm, the voice signal, to obtain n candidate recognition results, the candidate recognition results comprising text information corresponding to the voice signal, and n being an integer greater than 1; and identifying code configured to cause the at least one processor to identify, according to a selection rule selected from among m selection rules, the selection rule having an execution sequence of j, a target result from among the n candidate recognition results that are obtained as instructed by the speech recognition code, the target result being a candidate recognition result that has a highest matching degree with the voice signal in the n candidate recognition results, m being an integer greater than 1, an initial value of j being 1, and the m selection rules comprising at least two selected from among a command selection rule, a function selection rule, and a dialogue selection rule, wherein the identifying code is further configured to cause the at least one processor to identify the target result from among the n candidate recognition results according to a selection rule having an execution sequence of j+1 based on the identifying code not identifying the target result according to the selection rule having the execution sequence of j.

9. The speech recognition apparatus according to claim 8, wherein the computer program code further comprises execution sequence identifying code configured to cause the at least one processor to identify execution sequences of the m selection rules according to respective algorithm complexity degrees, wherein the execution sequences and the algorithm complexity degrees have a positive correlation.

10. The speech recognition apparatus according to claim 8, wherein an algorithm complexity degree of the command selection rule is lower than an algorithm complexity degree of the function selection rule, and the algorithm complexity degree of the function selection rule is lower than an algorithm complexity degree of the dialogue selection rule, wherein the command selection rule is used for instructing a speech recognition device to detect, depending on whether a command lexicon comprises a command keyword matching an $i^{th}$ candidate recognition result, whether the $i^{th}$ candidate recognition result is the target result, i being an integer, and 1≤i≤n;

wherein the function selection rule is used for instructing the speech recognition device to detect, depending on whether a voice lexicon comprises a lexicon keyword matching a voice keyword, whether the $i^{th}$ candidate recognition result is the target result, the voice keyword being at least one keyword in the $i^{th}$ candidate recognition result, and wherein the dialogue selection rule is used for instructing the speech recognition device to identify a similarity degree between each candidate recognition result and the voice signal according to a trained language model, to select the target result.

11. The speech recognition apparatus according to claim 10, wherein the identifying code comprises first detection code and first identifying code, wherein the first detection code is configured to cause the at least one processor to detect whether a first correspondence of the command lexicon comprises the command keyword matching the $i^{th}$ candidate recognition result, wherein the first identifying code is configured to cause the at least one processor to identify, based on the first correspondence comprising the command keyword matching the $i^{th}$ candidate recognition result, the $i^{th}$ candidate recognition result as the target result, and wherein the first correspondence comprises at least the command keyword.

12. The speech recognition apparatus according to claim 11, wherein the identifying code further comprises second detection code, keyword searching code, second identifying code, and third identifying code, wherein the second detection code is configured to cause the at least one processor to detect, based on the first correspondence not comprising a command keyword matching any of the n candidate recognition results, whether a second correspondence of the command lexicon comprises a keyword matching any word in the $i^{th}$ candidate recognition result, wherein the keyword searching code is configured to cause the at least one processor to, based on the second correspondence comprising a keyword matching a word in the $i^{th}$ candidate recognition result, search, according to an index value corresponding to the keyword in the second correspondence, the first correspondence for a command keyword corresponding to the index value, wherein the second identifying code is configured to cause the at least one processor to identify an edit distance between the $i^{th}$ candidate recognition result and the command keyword, the edit distance indicating a quantity of operations required for conversion of the $i^{th}$ candidate recognition result into the command keyword, and wherein the third identifying code is configured to cause the at least one processor to identify, based on the edit distance being less than a preset value, the $i^{th}$ candidate recognition result as the target result, and wherein the first correspondence comprises a correspondence between the index value and the command keyword, and the second correspondence comprises a correspondence between the index value and the keyword.

13. The speech recognition apparatus according to claim 10, wherein the identifying code comprises template analysis code, third detection code, and fourth identifying code, wherein the template analysis code is configured to cause the at least one processor to analyze a function template of the $i^{th}$ candidate recognition result, wherein the third detection code is configured to cause the at least one processor to detect whether the voice lexicon comprises the lexicon keyword matching the voice keyword in the $i^{th}$ candidate recognition result, wherein the fourth identifying code is configured to identify, based on the voice lexicon comprising the lexicon keyword matching the voice keyword in the $i^{th}$ candidate recognition result, the $i^{th}$ candidate recognition result as the target result, and wherein the $i^{th}$ candidate recognition result comprises the function template and the voice keyword.

14. The speech recognition apparatus according to claim 10, wherein the identifying code comprises perplexity calculation code unit and fifth identifying code, wherein the perplexity calculation code is configured to cause the at least one processor to calculate a perplexity of each candidate recognition result according to the language model, wherein the fifth identifying code is configured to identify a smallest value of the perplexities in the n candidate recognition results and identifying the $i^{th}$ candidate recognition result corresponding to the smallest value as the target result, and wherein the perplexities are used for indicating the similarity degrees between the candidate recognition results and the voice signal, the perplexities and the similarity degrees have a negative correlation, the language model is an N-gram language model that is generated according to a dedicated corpus corresponding to at least one field, the N-gram language model is used for identifying an occurrence probability of a current word according to occurrence probabilities of N−1 words before the current word, and N is a positive integer.

15. One or more non-transitory storage mediums storing computer readable instructions, the computer readable instructions, when executed by one or more processors, causing the one or more processors to:

obtain a voice signal;

process the voice signal according to a speech recognition algorithm to obtain n candidate recognition results, the candidate recognition results comprising text information corresponding to the voice signal, and n being an integer greater than 1;

identify a target result from among the n candidate recognition results according to a selection rule selected from among m selection rules, the selection rule having an execution sequence of j, the target result being a candidate recognition result that has a highest matching degree with the voice signal in the n candidate recognition results, m being an integer greater than 1, an initial value of j being 1, and the m selection rules comprising at least two selected from among a command selection rule, a function selection rule, and a dialogue selection rule; and identify the target result from among the n candidate recognition results according to a selection rule having an execution sequence of j+1 based on the target result not being identified according to the selection rule having the execution sequence of j.

16. The one or more non-transitory storage mediums according to claim 15 wherein the computer readable instructions further cause the one or more processors to identify execution sequences of the m selection rules according to respective algorithm complexity degrees, wherein the execution sequences and the algorithm complexity degrees have a positive correlation.

17. The one or more non-transitory storage mediums according to claim 15, wherein an algorithm complexity degree of the command selection rule is lower than an algorithm complexity degree of the function selection rule, and the algorithm complexity degree of the function selection rule is lower than an algorithm complexity degree of the dialogue selection rule, wherein the command selection rule is used to detect, depending on whether a command lexicon comprises a command keyword matching an $i^{th}$ candidate recognition result, whether the $i^{th}$ candidate recognition result is the target result, i being an integer, and $1 \le i \le n$, wherein the function selection rule is used to detect, depending on whether a voice lexicon comprises a lexicon keyword matching a voice keyword, whether the $i^{th}$ candidate recognition result is the target result, the voice keyword being at least one keyword in the $i^{th}$ candidate recognition result, and wherein the dialogue selection rule is used to identify a similarity degree between each candidate recognition result and the voice signal according to a trained language model, to select the target result.

18. The one or more non-transitory storage mediums according to claim 17, wherein the selection rule having the execution sequence of j comprises the command selection rule, wherein the computer readable instructions further cause the one or more processors to:

detect whether a first correspondence of the command lexicon comprises the command keyword matching the $i^{th}$ candidate recognition result; and identify, based on the first correspondence comprising the command keyword matching the $i^{th}$ candidate recognition result, the $i^{th}$ candidate recognition result as the target result, wherein the first correspondence comprises at least the command keyword.

19. The one or more non-transitory storage mediums according to claim 18 wherein the computer readable instructions further cause the one or more processors to, after detecting whether the first correspondence of the command lexicon comprises the command keyword matching the $i^{th}$ candidate recognition result:

detect, based on the first correspondence not comprising a command keyword matching any of the n candidate recognition results, whether a second correspondence of the command lexicon comprises a keyword matching any word in the $i^{th}$ candidate recognition result;

search, based on the second correspondence comprising a keyword matching a word in the $i^{th}$ candidate recognition result, according to an index value corresponding to the keyword in the second correspondence, the first correspondence for a command keyword corresponding to the index value;

identify an edit distance between the $i^{th}$ candidate recognition result and the command keyword, the edit distance indicating a quantity of operations required for conversion of the $i^{th}$ candidate recognition result into the command keyword; and identify, based on the edit distance being less than a preset value, the $i^{th}$ candidate recognition result as the target result, wherein the first correspondence comprises a correspondence between the index value and the command keyword, and the second correspondence comprises a correspondence between the index value and the keyword.

20. The one or more non-transitory storage mediums according to claim 17, wherein the selection rule having the execution sequence of j comprises the function selection rule, wherein the computer readable instructions further cause the one or more processors to identify the target result in the n candidate recognition results according to the selection rule having the execution sequence of j by:

analyzing a function template of the $i^{th}$ candidate recognition result;

detecting whether the voice lexicon comprises the lexicon keyword matching the voice keyword in the $i^{th}$ candidate recognition result; and identifying, based on the voice lexicon comprising the lexicon keyword matching the voice keyword in the $i^{th}$ candidate recognition result, the $i^{th}$ candidate recognition result as the target result, and wherein the $i^{th}$ candidate recognition result comprises the function template and the voice keyword.

\* \* \* \* \*